US00RE38807E

(19) United States
(12) Reissued Patent
Takeuti et al.

(10) Patent Number: US RE38,807 E
(45) **Date of Reissued Patent: *Oct. 4, 2005**

(54) HIGH PRESSURE DISCHARGE LAMP, WITH TUNGSTEN ELECTRODE AND LIGHTING OPTICAL APPARATUS AND IMAGE DISPLAY SYSTEM USING THE SAME

(75) Inventors: Nobuyosi Takeuti, Hirakata (JP); Yoshiki Kitahara, Takatsuki (JP); Takeharu Tsutsumi, Takatsuki (JP)

(73) Assignee: Matsushita Electric Industrial Co., Ltd., Osaka (JP)

( * ) Notice: This patent is subject to a terminal disclaimer.

(21) Appl. No.: 10/405,091

(22) Filed: Apr. 1, 2003

Related U.S. Patent Documents

Reissue of:
(64) Patent No.: 6,211,616
Issued: Apr. 3, 2001
Appl. No.: 09/189,908
Filed: Nov. 12, 1998

(30) Foreign Application Priority Data

Nov. 18, 1997 (JP) ..... 9-316752

(51) Int. Cl.[7] ..... H01J 17/20
(52) U.S. Cl. ..... 313/637; 313/639; 313/642; 313/113; 313/633; 313/571; 313/641; 313/643; 313/631; 313/632; 313/636; 313/638; 313/640; 313/566
(58) Field of Search ..... 313/628, 631–634, 313/566–568, 571, 623, 626, 637–643; 445/26, 38

(56) References Cited

U.S. PATENT DOCUMENTS 4,156,826 A * 5/1979 Hernqvist ..... 313/565
5,109,181 A * 4/1992 Fischer et al. ..... 313/571
5,299,279 A * 3/1994 Roberts ..... 392/421
5,670,844 A * 9/1997 Yasudaa et al. ..... 313/636
5,691,601 A * 11/1997 Frey et al. ..... 313/571
5,831,388 A * 11/1998 Genz et al. ..... 313/641
6,483,240 B2 * 11/2002 O'Hare et al. ..... 313/633
6,492,772 B1 * 12/2002 Takeuchi ..... 313/633

FOREIGN PATENT DOCUMENTS

EP 641015 A2 * 3/1995 ..... H01J/61/86
GB 2064211 A * 6/1981 ..... H01J/61/073
JP 54050359 A * 4/1979 ..... G01B/15/02
JP 54102069 A * 8/1979 ..... H01J/61/88
JP 1-50359 * 2/1989

OTHER PUBLICATIONS

Communication from European Patent Office and attached Search Report, Sep. 3, 1999.*

* cited by examiner

*Primary Examiner*—Nimeshkumar D. Patel
*Assistant Examiner*—Sikha Roy
(74) *Attorney, Agent, or Firm*—Merchant and Gould P.C.

(57) ABSTRACT

The present invention provides a high pressure discharge lamp which is provided with a discharge tube containing a pair of electrodes therein and being filled with mercury, an inert gas and a halogen gas, the amount of the mercury filled being 0.12 to 0.35 mg/mm$^3$, the halogen gas being at least one gas selected from the group consisting of Cl, Br and I and being present in an amount of $10^{-7}$ to $10^{-2}$ $\mu$mol/mm$^3$, and the electrodes being mainly composed of tungsten, and the tungsten as a material of the electrodes contains not more than 12 ppm of potassium oxide ($K_2O$). In such a high pressure discharge lamp, blackening of the discharge tube due to the potassium oxide ($K_2O$) contained in the tungsten, and decrease in illumination maintenance can be prevented, thus providing a high pressure discharge lamp with a long lifetime, a lighting optical apparatus using the high pressure discharge lamp as a light source, and an image display system using the lighting optical apparatus. In another aspect, the amount of —OH in the glass of the discharge tube is less than 3 ppm. In a further aspect, the discharge lamp has a restriking voltage of less than 20 V.

15 Claims, 8 Drawing Sheets

HIGH PRESSURE DISCHARGE LAMP, WITH TUNGSTEN ELECTRODE AND LIGHTING OPTICAL APPARATUS AND IMAGE DISPLAY SYSTEM USING THE SAME

Matter enclosed in heavy brackets [ ] appears in the original patent but forms no part of this reissue specification; matter printed in italics indicates the additions made by reissue.

FIELD OF THE INVENTION

The present invention relates to a high pressure discharge lamp for use in general lighting fittings and optical apparatuses etc., and to a lighting optical apparatus comprising the high pressure discharge lamp and a reflecting mirror which are integrated into one unit, and to an image display system comprising the lighting optical apparatus and an image forming device.

BACKGROUND OF THE INVENTION

Conventionally, a lighting optical apparatus, which is used as a light supply in an image display system used in a liquid crystal projector or the like, usually comprises a light source and a reflecting mirror, which are integrated into one unit. Examples of the light source include halogen lamps, metal halide lamps, xenon lamps, extra-high pressure mercury lamps, and the like.

Recently, because of its good efficiency, high luminance, good balance of red, blue and green in the emitted light, long lifetime, and others, an extra-high pressure mercury lamp having a short electrode spacing, that is, with a short arc, which is close to a point light source, has been used as a light source for a lighting optical apparatus.

Previously, this type of lighting optical apparatus as shown in FIG. 8, which comprises a high pressure discharge lamp, e.g. an extra-high pressure mercury lamp 17, and a concave reflecting mirror 9 having a paraboloidal or ellipsoidal reflection surface (hereinafter referred to as the reflecting mirror 9) integrated into one unit, has been used.

The light radiated from the extra-high pressure mercury lamp 17 is reflected by the reflecting mirror 9 and then it is radiated forward. If such a lighting optical apparatus is combined with an image display system with a condenser lens or an image forming device such as a liquid crystal panel, the light radiated forward is led into the condenser lens with a determined area, or into the image forming device such as a liquid panel in the image display system.

If the light reflected forward by the reflecting mirror 9 is parallel rays, the condensing efficiency becomes high. Thus, the light source is preferably a point light source. Therefore, as extra-high pressure mercury lamp having a short electrode spacing, i.e. with a short arc, which enables a point light source, may be used.

As an example of a conventional extra-high mercury lamp, FIG. 8 illustrates the extra-high pressure mercury lamp 17 which comprises a luminous vessel 17a containing a pair of electrodes therein, and sealing parts 17b connected to each end of the luminous vessel 17a. An installation body as described below is sealed in each of the sealing parts 17b. The installation body comprises an electrode 18 comprising an electrode rod 18b and a coil 18a connected to the top end of the rod 18b, a metallic foil 5 comprising molybdenum whose one end is connected to the bottom end of the rod 18b, and an external lead wire 6 whose one end is connected to the other end of the metallic foil 5. The installation body is sealed in the sealing part 17b in such a way that the electrode 18 is located in the luminous vessel 17a.

One external lead wire (not shown) is electrically connected to the base 7, and the other external lead wire 6 is connected to a power-supplying wire (not shown).

The luminous vessel 17a is filled with mercury as a light-emitting metal and rare gases, e.g. argon. The extra-high pressure mercury lamp 17 is attached to and integrated with the reflecting mirror 9. The reflecting mirror 9 is made of a material selected from the group consisting of glass, metals and ceramic, and also has a reflecting surface comprising a deposited film of $TiO_2$—$SiO_2$ and the like with excellent reflection property on the inner surface of the concave mirror. A front light-projecting portion of the reflecting mirror 9, i.e. the opening portion, has a diameter of about 50 to 120 mm. The mirror 9 is further provided with a cylindrical support 10 at the back portion thereof. A base 7 of the extra-high pressure mercury lamp 17 is fixed to the cylindrical support 10 with an adhesive 11, e.g. an insulating cement. Thereby, the extra-high pressure mercury lamp 17 is attached to the reflecting mirror 9 in such a way that the axis of the lamp corresponds approximately to the center of the reflecting mirror 9. Furthermore, a lead-in hole (not shown) is formed through the reflecting mirror 9, and above-mentioned power-supplying wire penetrates through the hole and is lead into the back side of the reflecting mirror 9. In the case of power consumption at 80 to 150 W, such a conventional extra-high mercury lamp 17 has an electrode spacing as short as 1.0 to 2.0 mm, and is usually lighted up by a high-frequency alternating current power source at 125 to 400 Hz.

When such a discharge lamp with a short arc and a high luminance is lighted, the temperature at the end of the electrodes becomes very high, so that tungsten used as a material of the electrodes is scattered and adheres to the inner wall of the discharge tube. Thus, blackening of the discharge tube occurs within several tens of hours. In order to inhibit such blackening of the discharge tube, a method of filling a halogen gas in the discharge tube, so as to prevent blackening of the tube by utilizing a reaction called halogen cycle, has been proposed (Japanese Published Unexamined Patent Application (Tokkai) No. HEI 2-148561). The extra-high pressure mercury lamp as proposed in this publication is filled with more than 0.2 $mg/mm^3$ of mercury, and is also filled with at least one halogen selected from the group consisting of Cl, Br and I in an amount of $10^{-6}$ to $10^{-4}$ $\mu mol/mm^3$.

However, in such a lamp, the pressure in the discharge tube during operation exceeds $2.0\times10^7$ Pa (200 bars), so that even a little blackening of the discharge tube can cause deformation of the tube, which may result in bursting of the discharge tube. Furthermore, residual impurity gases remained in the discharge tube, and impurity gases discharged from the electrodes and the quartz glass, which is used as a material of the discharge tube, inhibit the halogen cycle, resulting in shortening the lifetime of the lamp.

Thus, although such a conventional high pressure discharge lamp with a short arc and a high luminance has excellent initial properties, it has a disadvantage with respect to the lifetime of the lamp.

SUMMARY OF THE INVENTION

It is an object of the present invention to provide a high pressure discharge lamp with a long lifetime, a lighting optical apparatus having such a high pressure discharge lamp as a light source, and an image display system using the lighting optical apparatus, by optimizing the amount of mercury filled and the halogen gas concentration in the discharge tube, and further by inhibiting generation of residual gases in the discharge tube and unnecessary gases which are generated during lighting.

In order to achieve the above-mentioned object, the high pressure discharge lamp of the present invention is provided with a discharge tube which contains a pair of electrodes therein and is filled with mercury, an inert gas and a halogen gas, the amount of the mercury filled being 0.12 to 0.35 $mg/mm^3$, the halogen gas being at least one gas selected from the group consisting of Cl, Br and I, and being present in the range of $10^{-7}$ to $10^{-2}$ $\mu mol/mm^3$, and the electrodes mainly being composed of tungsten, wherein the tungsten as a material of the electrodes contains not more than 12 ppm of potassium oxide ($K_2O$). Accordingly, blackening of the discharge tube due to potassium oxide contained in the tungsten, and decrease in illumination maintenance can be prevented, so that a high pressure discharge lamp with a long lifetime can be obtained. The content of the potassium oxide ($K_2O$) in the tungsten may be any amount in the range of not more than 12 ppm, but it is preferably 0 ppm to not more than 8 ppm, particularly preferably 0 ppm to not more than 5 ppm.

In the high pressure discharge lamp of the present invention, it is preferable that the discharge tube is made of quartz glass, and the content of hydroxyl group (—OH group) in the quartz glass is not more than 3 ppm. Thus, blackening of the discharge tube can be prevented, so that a high pressure discharge lamp with a long lifetime can be obtained. It is preferable that the content of hydroxyl group (—OH group) is in the range of 0 to 3 ppm, particularly preferably 0 to 1 ppm.

Furthermore, in the high pressure discharge lamp of the present invention, it is preferable that the restriking voltage observed within several seconds to two minutes from starting is not more than 20 V. Thus, a high pressure discharge lamp with a long lifetime can be obtained. The restriking voltage is preferably in the range of 0 to 15 V, particularly preferably 0 to 10 V.

Still furthermore, in the high pressure discharge lamp of the present invention, in the case of lighting by direct current, it is preferable that the volume of the electrode to be an anode during lighting is larger than the volume of the electrode to be a cathode. Thus, the lifetime of the lamp can be further extended.

Still furthermore, in the high pressure discharge lamp of the present invention, it is preferable that the illumination maintenance on the screen is at least 85%, more preferably at least 87%, and particularly preferably at least 90% after lighting for 2000 hours.

The lighting optical apparatus of the present invention comprises a reflecting mirror having a paraboloidal or ellipsoidal reflecting surface, and the high pressure discharge lamp according to the present invention, wherein the arc axis of the high pressure discharge lamp is located on the optical axis of the reflecting mirror so as to integrate the high pressure discharge lamp with the reflecting mirror. Thus, a lighting optical apparatus with a long lifetime can be obtained.

The image display system of the present invention comprises a light supplying source comprising a light source and lenses, and an image forming device, wherein the lighting optical apparatus of the present invention is used in the light supplying source. Thus, an image display system with a long lifetime can be obtained.

DESCRIPTION OF THE PREFERRED EMBODIMENTS

The present invention will be further described in detail in the following.

First Embodiment

A high pressure discharge lamp according to the first embodiment of the present invention and a lighting optical apparatus using the high pressure discharge lamp as a light source will be described in the following.

Figure 1:
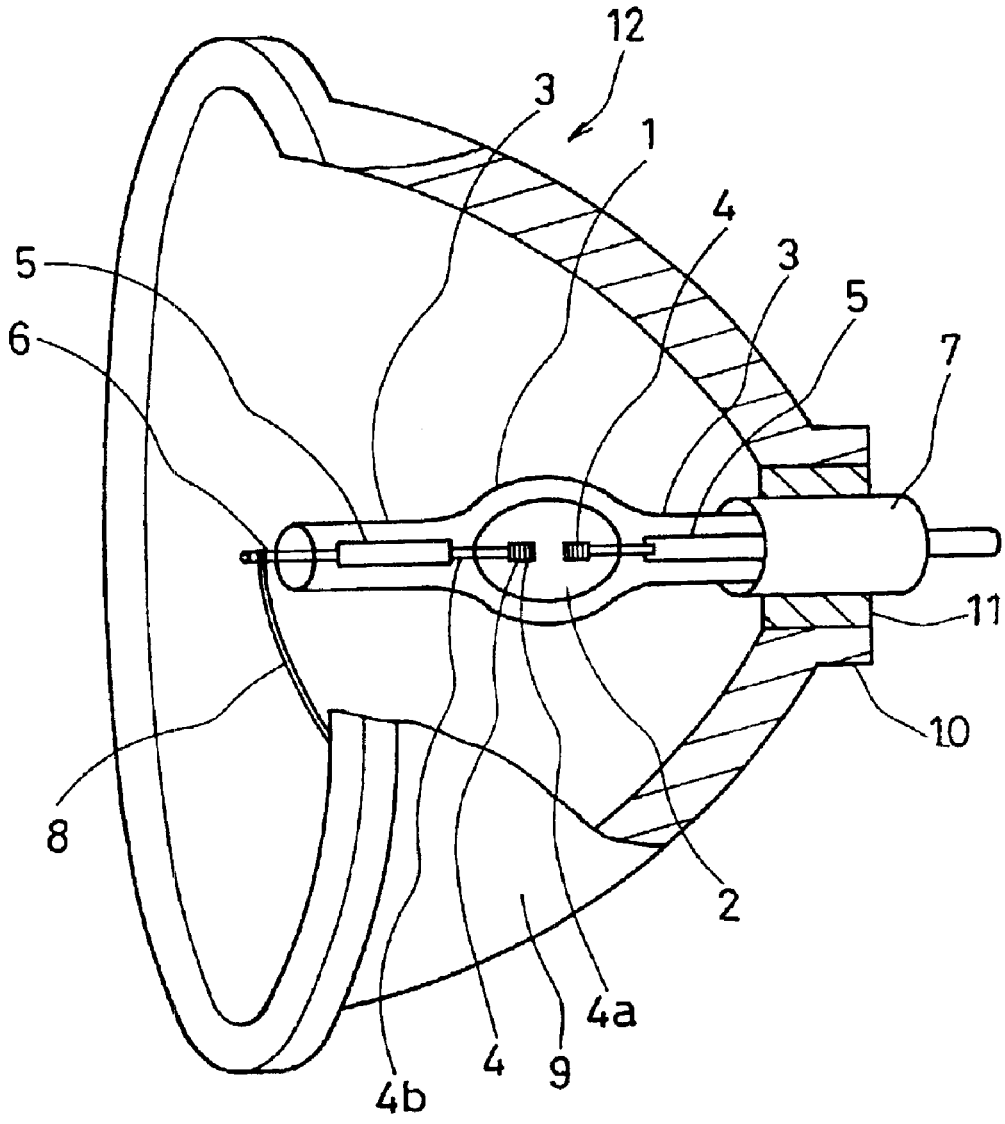
FIG. 1 is a partially cutaway perspective view of a lighting optical apparatus comprising a high pressure discharge lamp according to a first embodiment of the present invention and a reflecting mirror.

FIG. 1 shows a high pressure discharge lamp having a discharge tube 1 made of quartz glass comprising an approximately spheroid shaped luminous vessel 2 with a maximum inner diameter in the central region of 6.5 mm, a content volume of 180 $mm^3$ and a thickness of 2.5 mm, and sealing parts 3 connected to each end of the luminous vessel 2. Each of the sealing parts 3 seals an installation body as described below.

The installation body comprises: an electrode 4 comprising an electrode rod 4b with a diameter of 0.4 mm which comprises tungsten containing 4.0 ppm of potassium oxide ($K_2O$), and a coil 4a with a diameter of 0.2 mm which comprises tungsten containing 4.0 ppm of potassium oxide ($K_2O$), and which is placed on the tip of the electrode rod 4b; a metallic foil 5 comprising molybdenum whose one end is connected to the bottom end of the electrode rod 4b; and an external lead wire 6 whose one end is connected to the other end of the metallic foil 5. The installation body is sealed in the sealing part 3 in such a way that the electrodes 4 are located in the luminous vessel 2.

One of the sealing parts 3 is provided with a base 7, which is electrically connected to an external lead wire (not shown) extending from the sealing part 3 provided with the base 7.

The external lead wire 6 on the other side is connected to one end of a power-supplying wire 8, whose other end penetrates through a reflecting mirror 9 as described below and extends to the outside on the opposite side of the reflecting surface.

The distance between the electrode in the luminous vessel 2, i.e. the arc length, is 1.5 mm. The luminous vessel 2 is filled with 28.5 mg (about 0.16 mg/mm$^3$) of mercury, $1.0\times10^{-4}$ $\mu$mol/mm$^3$ of Br as a halogen gas, and in addition 250 mbar of Ar as a rare gas for starting. Then, this discharge tube 1 is combined with the reflecting mirror 9 so as to form a lighting optical apparatus 12.

The funnel-shaped reflecting mirror 9 made of ceramic has a reflecting surface comprising a deposited film of $TiO_2$—$SiO_2$ on the inner surface of the concave mirror. The reflecting mirror 9 has a front light-projecting portion, i.e. the opening portion, which has a diameter of about 65 mm, and a cylindrical support 10 positioned on the to of the back portion thereof. The base 7 is adhered to the cylindrical support 10 with an insulating cement 11, in such a way that the center axis of the discharge tube 1 (which includes the pair of the electrodes) approximately corresponds to the center axis of the reflecting mirror 9.

In the high pressure discharge lamp of this embodiment and in the lighting optical apparatus 12 using the high pressure discharge lamp as a light source, the base 7 and the power-supplying wire 8 were connected to an alternating current power source, and it was lit up with a lamp voltage of about 60 V, a lamp current of about 2.5 A, and a lamp power of 150 W. The restriking voltage (peak value) of this lamp was about 10 V.

Figure 2:
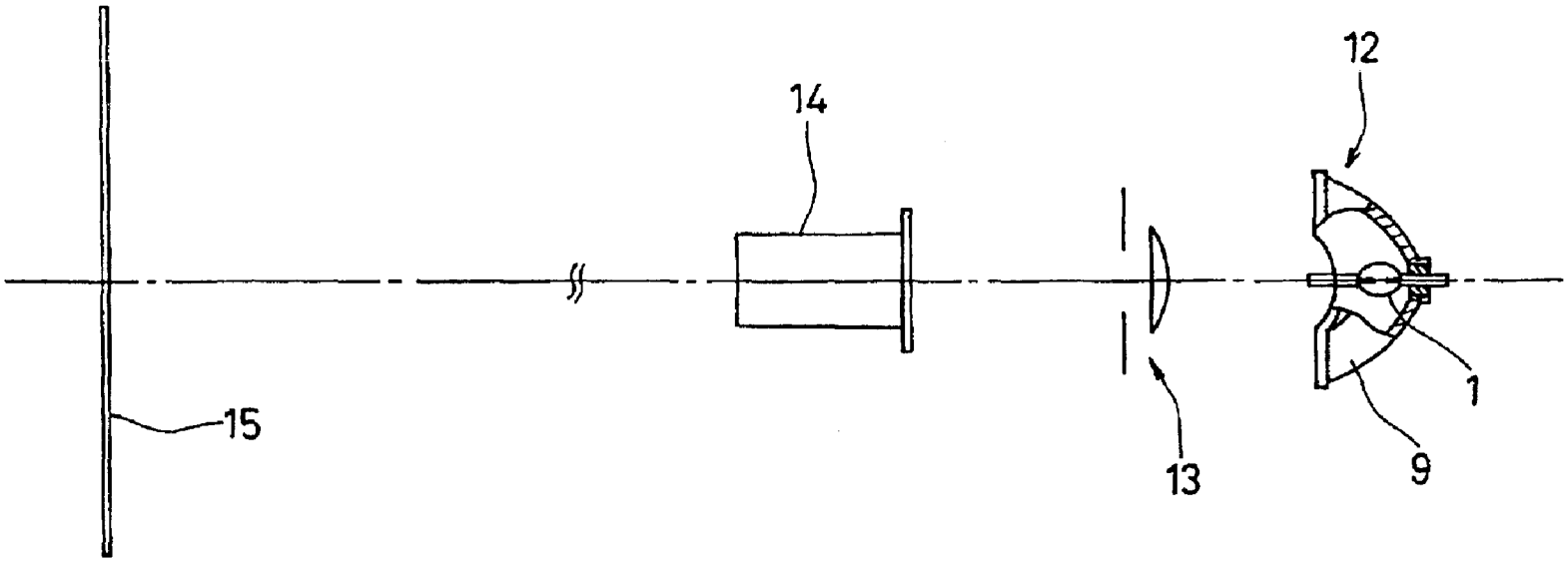
FIG. 2 is a diagram showing an optical system used for evaluating the lamp in FIG. 1.

An image display system was constructed by incorporating the lighting optical apparatus 12 of this embodiment into an optical system as shown in FIG. 2, and then it was operated at the rated power. The results showed that the lamp efficiency was 601 m/W, and the color temperature of a light that was radiated from the discharge tube 1 and reflected from the reflecting mirror 9 was about 6800 K. Then, the lighting optical apparatus 12 of this embodiment was operated at the rated power and was subjected to a life test. The numerals 12, 13, 14 and 15 designate the lighting optical apparatus of this embodiment, a condenser lens, a projection lens system, and a light-intercepting surface (a screen), respectively.

Figure 3:
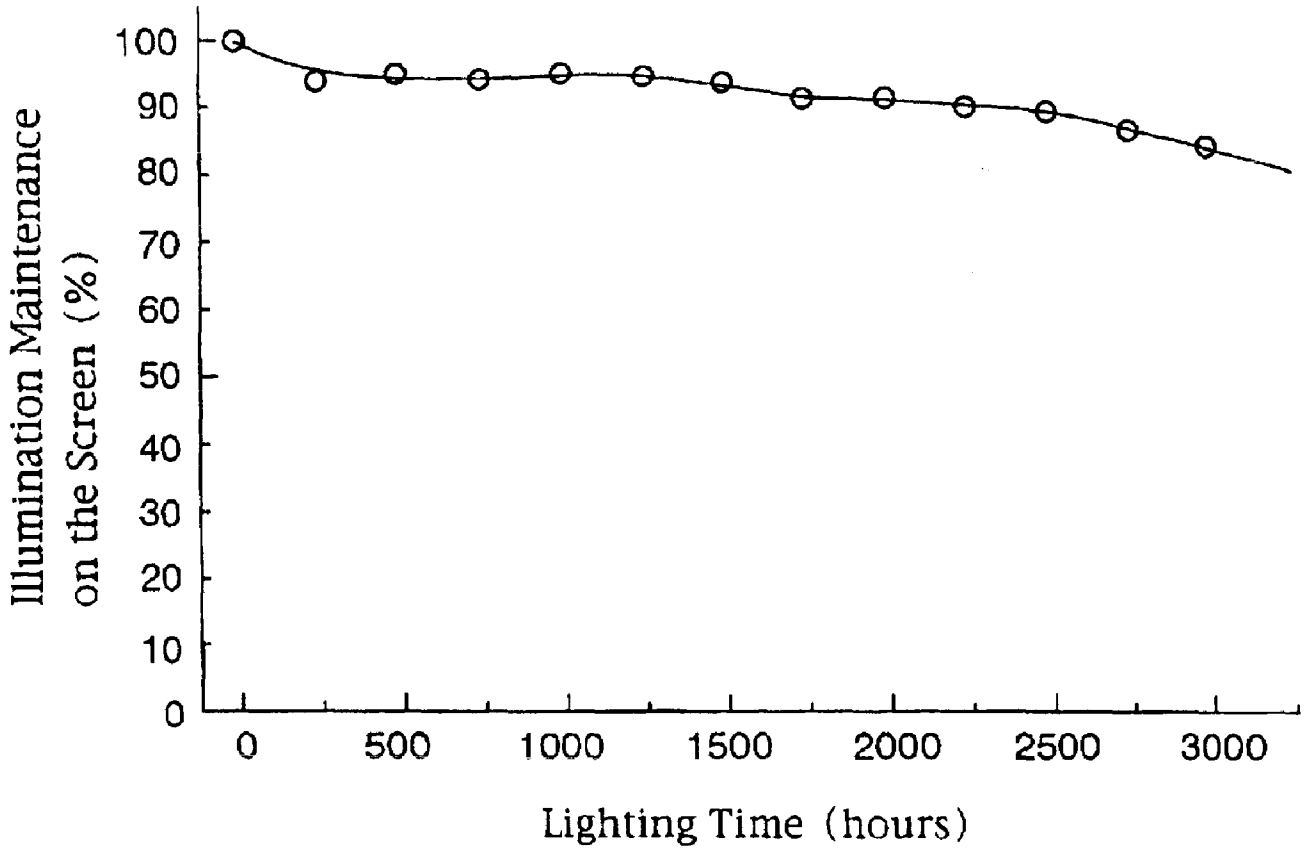
FIG. 3 is a diagram showing the relationship between the lighting time and the illumination maintenance on the screen in an image display system according to the first embodiment of the present invention.

The results of the life test showed that after 2500 hours of lighting, cloudiness and blackening were not caused in the discharge tube 1 at all, and moreover, as is evident from FIG. 3, about 90% illumination maintenance on the screen was sustained. Thus, good results were obtained.

Second Embodiment

Using the same drawing of FIG. 1 as in the above embodiment, a high pressure discharge lamp according to the second embodiment of the present invention and a lighting optical apparatus using the high pressure discharge lamp as a light source will be described in the following.

In this embodiment, the luminous vessel 2 has a maximum inner diameter in the central region of 5.0 mm, a content volume of 80 mm$^3$ and a thickness of 2.5 mm. Each of the electrodes 4 comprises an electrode rod 4b with a diameter of 0.35 mm which comprises tungsten containing 4.2 ppm of potassium oxide ($K_2O$), and a coil 4a with a diameter of 0.2 mm which comprises tungsten containing 4.2 ppm of potassium oxide ($K_2O$), which is placed on the tip of the electrode rod 4b. The distance between the electrodes in the luminous vessel 2, i.e. the arc length, is 1.0 mm. The luminous vessel 2 is filled with 16.5 mg (about 0.205 mg/mm$^3$) of mercury, $1.5\times10^{-4}$ $\mu$mol/mm$^3$ of Br as a halogen gas, and in addition 250 mbar of Ar as a rare gas for starting. The reflecting mirror 9 has a front light-projecting portion, i.e. the opening portion, with a diameter of about 60 mm. The rest of the structure is the same as the above first embodiment.

In a lighting optical apparatus 12 comprising a high pressure discharge lamp with a short arc according to this embodiment and a reflecting mirror, the base 7 and the power-supplying wire 8 were connected to an alternating current power source, and it was lit up with a lamp voltage of about 60 V, a lamp current of about 2.1 A, and a lamp power of 125 W. The striking voltage (peak value) of this lamp was about 10 V.

An image display system was constructed by incorporating the lighting optical apparatus having the above structure into the optical system as shown in FIG. 2, and then it was operated at the rated power. The results showed that the lamp efficiency was 551 m/W, and the color temperature of the light which was radiated from the discharge tube 1 and reflected from the reflecting mirror 9 was about 6500 K. Then, the lighting optical apparatus of this embodiment was operated at the rated power and subjected to a life test.

Figure 4:
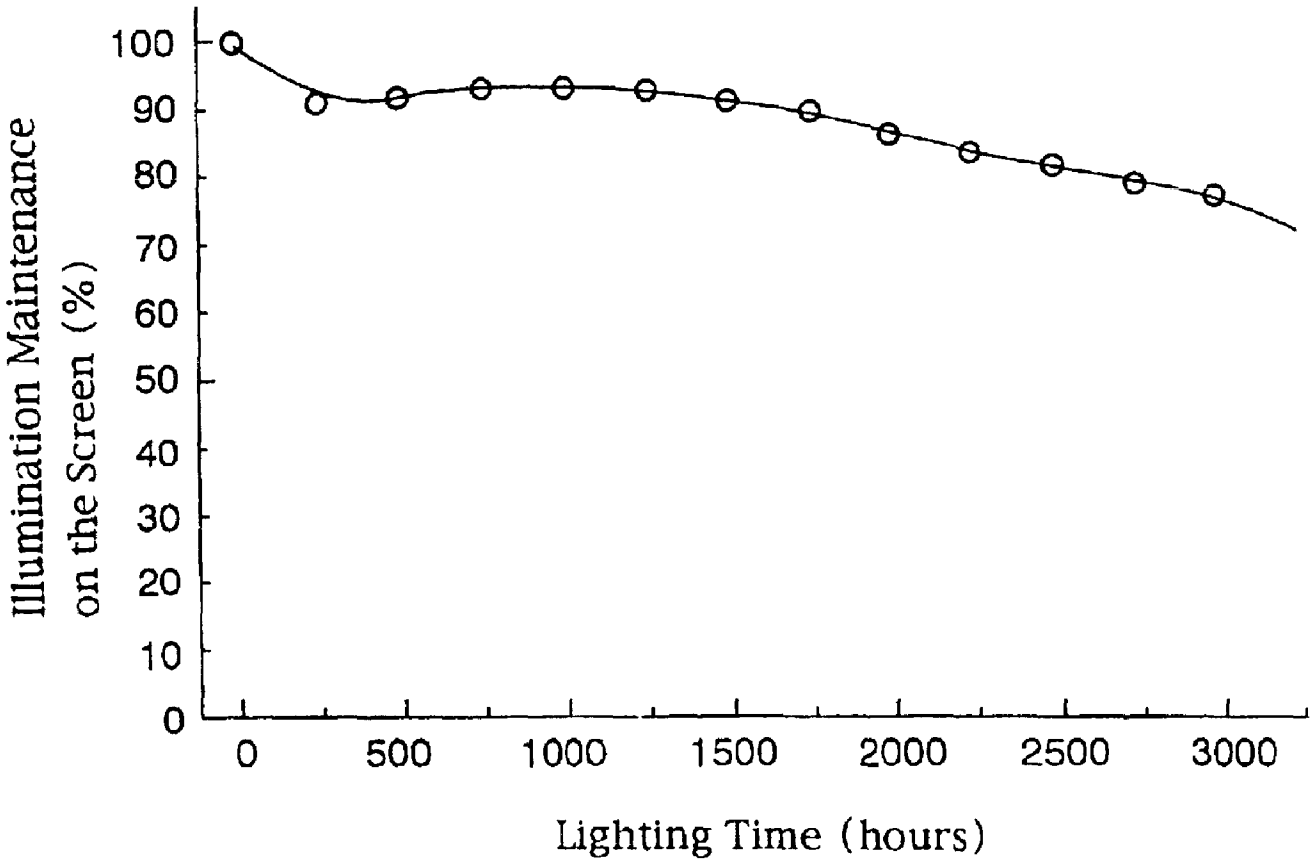
FIG. 4 is a diagram showing the relationship between the lighting time and the illumination maintenance on the screen in an image display system according to a second embodiment of the present invention.

The results of the life test showed that after 2000 hours of lighting, cloudiness and blackening were not caused in the discharge tube 1 at all, and moreover, as is evident from FIG. 4, about 87% illumination maintenance on the screen was sustained. Thus, good results were obtained.

Third Embodiment

A high pressure discharge lamp according to the third embodiment of the present invention, and a lighting optical apparatus using the high pressure discharge lamp as a light source, will be described in the following.

Figure 5:
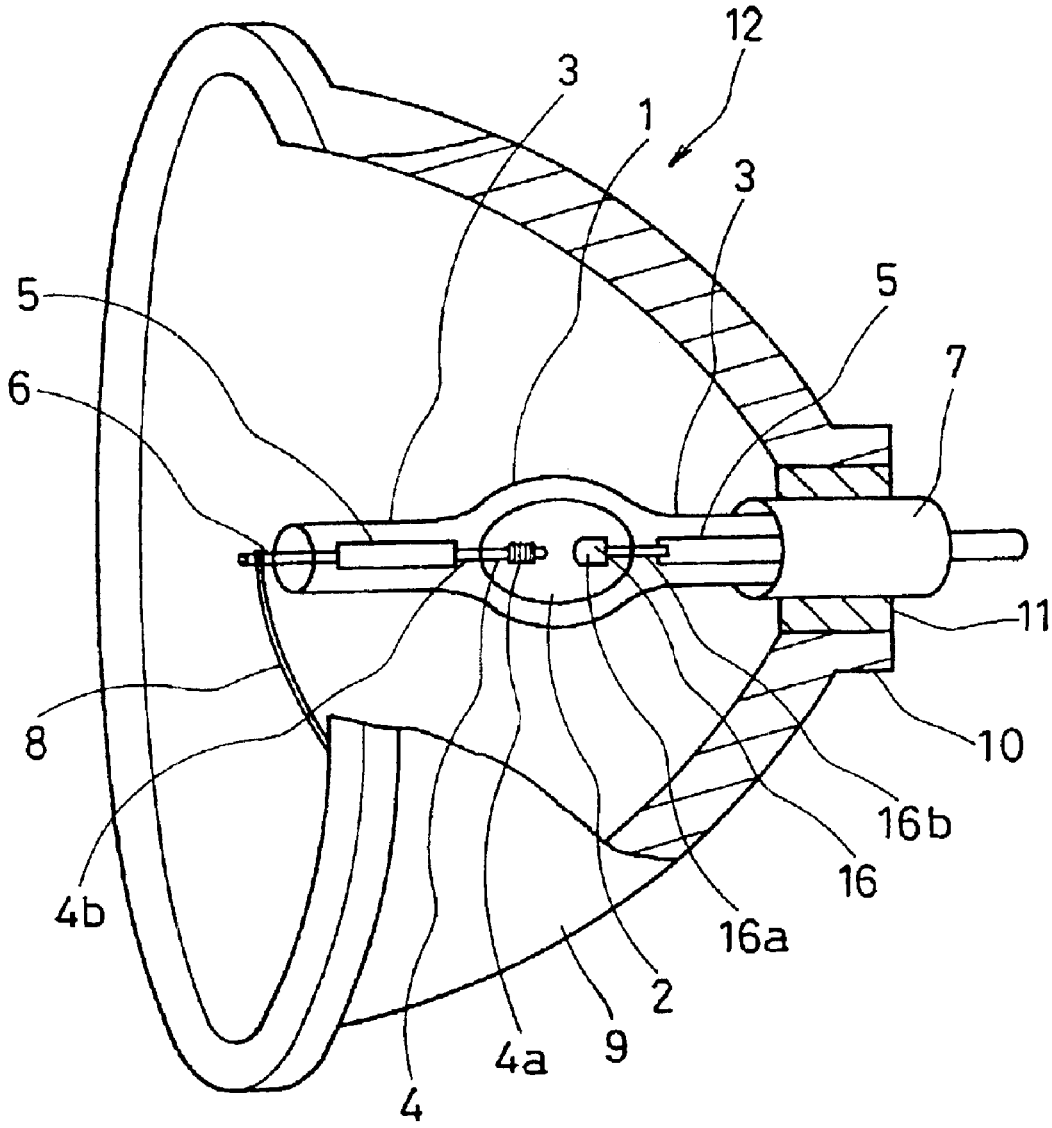
FIG. 5 is a partially cutaway perspective view of a lighting optical apparatus comprising a high pressure discharge lamp according to a third embodiment of the present invention and a reflecting mirror.

In the high pressure discharge lamp according to this embodiment, as shown in FIG. 5, the luminous vessel 2 has a maximum inner diameter in the central region of 7.0 mm, a content volume of 230 mm$^3$ and a thickness of 2.5 mm. One electrode 4 comprises an electrode rod 4b with a diameter of 0.45 mm which comprises tungsten containing 4.8 ppm of potassium oxide ($K_2O$), and a coil 4a with a diameter of 0.2 mm which comprises tungsten containing 4.8 ppm of potassium oxide ($K_2O$), which is attached onto the tip of the electrode rod 4b at a distance of 0.75 mm from the top of the electrode rod 4b. The other electrode 16 comprises tungsten containing 4.3 ppm of potassium oxide ($K_2O$); and comprises a tip 16a with a maximum diameter of 1.7 mm and with a diameter of the top of 0.6 mm, and an electrode rod 16b with a diameter of 0.45 mm. The distance between the electrodes in the luminous vessel 2, i.e. the arc length, is 1.5 mm. The luminous vessel 2 is filled with 37.0 mg (about 0.16 mg/mm$^3$) of mercury, $7.5\times10^{-5}$ $\mu$mol/mm$^3$ of Br as a halogen gas, and in addition 250 mbar of Ar as a rare gas for starting. The reflecting mirror 9 has a front light-projecting portion, i.e. the opening portion, with a diameter of about 70 mm. The rest of the structure is the same as the above first embodiment.

In a lighting optical apparatus comprising a high pressure discharge lamp with a short arc according to this embodiment and a reflecting mirror, the base 7 and the power-supplying wire 8 were connected to a direct current power source, and it was lit up with a lamp voltage of about 65 V, a lamp current of about 2.4 A, and a lamp power of 160 W.

An image display system was constructed by incorporating the lighting optical apparatus 12 having the above structure into the optical system as shown in FIG. 2, and then it was operated at the rated power. The results showed that the lamp efficiency was 621 m/W, and the color temperature of a light that was radiated from the discharge tube 1 and reflected from the reflecting mirror 9 was about 6500 K. Then, the lighting optical apparatus of this embodiment was operated at the rated power, and subjected to a life test.

Figure 6:
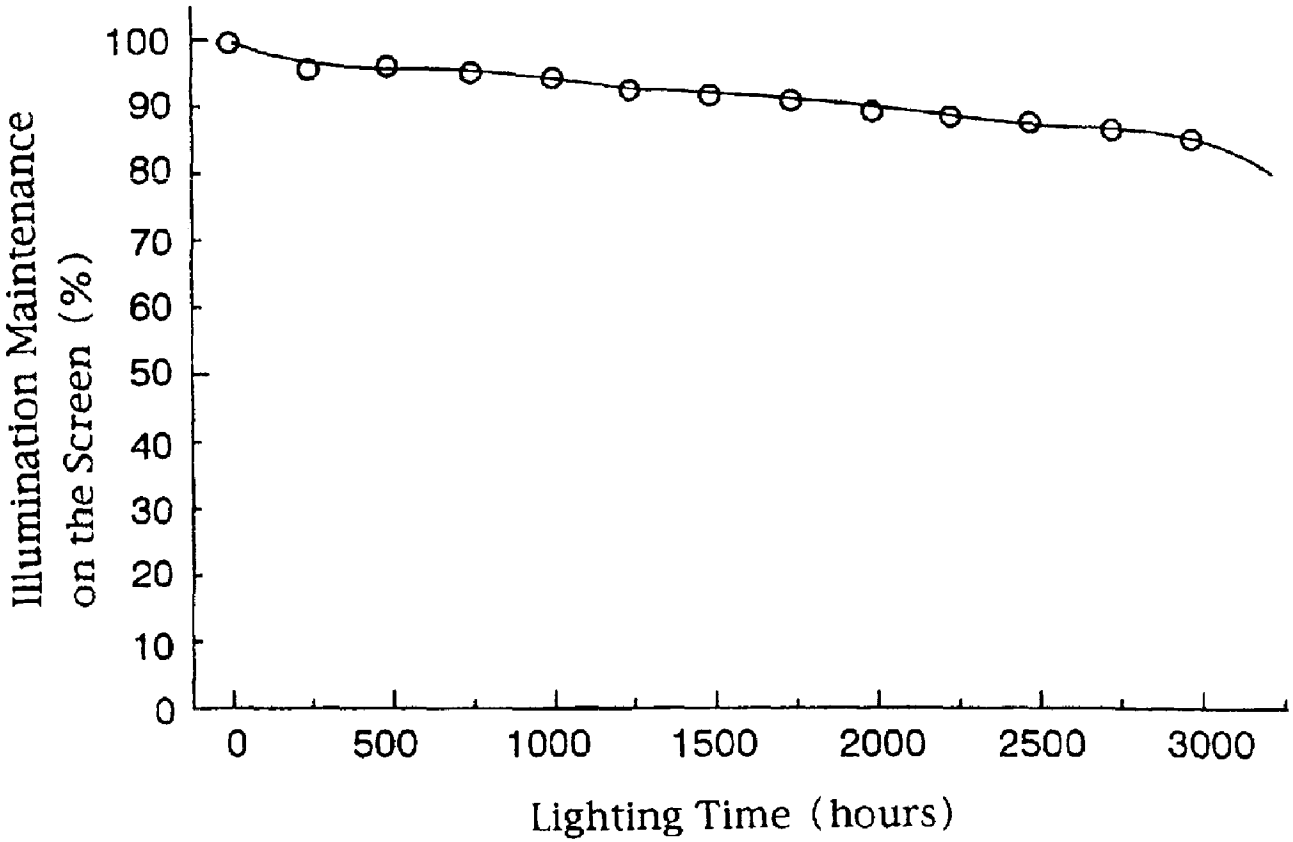
FIG. 6 is a diagram showing the relationship between the lighting time and the illumination maintenance on the screen in an image display system according to the third embodiment of to the present invention.

The results of the life test showed that after 3000 hours of lighting, cloudiness and blackening were not caused in the discharge tube 1 at all, and moreover, as is evident from FIG. 6, about 85% illumination maintenance on the screen was sustained. Thus, good results were obtained.

The reasons why the electrodes are mainly composed of tungsten, and why the content of the potassium oxide ($K_2O$) in the tungsten electrodes is in the range of not more than 12 ppm, are described in the following.

Using seven types of electrodes, containing 5 ppm or less, 8 ppm, 12 ppm, 15 ppm, 30 ppm, 75 ppm and 100 ppm of $K_2O$ respectively, lamps were manufactured and then subjected to life tests. The life tests were carried out by lighting the lamps for 100 hours. The results of the illumination maintenance after lighting the lamps for 100 hours are shown in Table 1. The reason why the life tests were carried out by lighting the lamps for 100 hours is that, there is not a large decrease in the illumination maintenance at a time after 100 hours, so that the illumination maintenance at a time of 2000 to 3000 hours can be estimated from the test results of lighting for 100 hours.

TABLE 1

| Content of $K_2O$ (ppm) | 5 | 8 | 12 | 15 | 30 | 75 | 100 |
|---|---|---|---|---|---|---|---|
| Illumination Maintenance (%) | 97 | 94 | 90 | 82 | 79 | 76 | 72 |
| Generation of Blackening | None | None | None | Generated | Generated | Generated | Generated |
| Total Evaluation | Good | Good | Good | Defective | Defective | Defective | Defective |

As is evident from Table 1, the test results showed that in the lamps using electrodes containing at least 15 ppm of $K_2O$, blackening was generated in the discharge tubes at an early time in lighting, so that illumination maintenance was reduced in these lamps. Also, the results showed that the greater the content of $K_2O$ in the electrodes, the larger the degree of blackening of the discharge tube. As a result of analysis, it was found that the presence of $K_2O$ contained in the tungsten electrodes greatly inhibits the halogen cycle. Therefore, the $K_2O$ concentration in the electrodes is specified to be in the above-mentioned range. Furthermore, the less content of $K_2O$ in the tungsten electrodes, the better the performance of the lamps. Preferably, the content of $K_2O$ in the tungsten electrodes is in the range of not more than 8 ppm, so that 94% illumination maintenance after 100 hours can be achieved. More preferably, the content of $K_2O$ in the tungsten electrodes is in the range of not more than 5 ppm, so that 97% illumination maintenance after 100 hours can be achieved.

Furthermore, the reason why the water (–OH group) content in the quartz glass is specified to be in the range of not more than 3 ppm above will be described in the following.

Using six types of quartz glass, containing 1 ppm, 3 ppm, 6 ppm, 10 ppm, 15 ppm and 20 ppm of —OH group respectively, lamps were manufactured and subjected to life tests. The results of the illumination maintenance after lighting the lamps for 100 hours are shown in Table 2.

TABLE 2

| Content of —OH (ppm) | 1 | 3 | 6 | 10 | 15 | 20 |
|---|---|---|---|---|---|---|
| Illumination Maintenance (%) | 96 | 95 | 88 | 84 | 81 | 80 |
| Generation of Blackening | None | None | Generated | Generated | Generated | Generated |
| Total Evaluation | Good | Good | Defective | Defective | Defective | Defective |

As is evident from Table 2, in the lamps using quartz glass containing at least 6 ppm of —OH group, blackening of the lamp was generated within 100 hours of lighting, and the higher the concentration of —OH group, the larger the degree of blackening of the discharge tube.

When the lamp is lit up, the water in the quart glass near the inner surface of the discharge tube enters into the discharge tube by diffusion. It was found that if the amount of the entering water is large, the halogen cycle is inhibited, promoting blackening of the lamp. Therefore, the water (—OH group) content in the quartz glass was specified to be in the above-mentioned range. The less the content of the water (—OH group) in the quartz glass, the better the performance of the lamp. Preferably, the water content in the quartz glass is in the range of not more than 1 ppm, so that 96% illumination maintenance after 100 hours can be sustained.

Furthermore, the reason why the restriking voltage (peak value) observed within several seconds to two minutes from starting is specified to be in the range of not more than 20 V will be described in the following.

Figure 7:
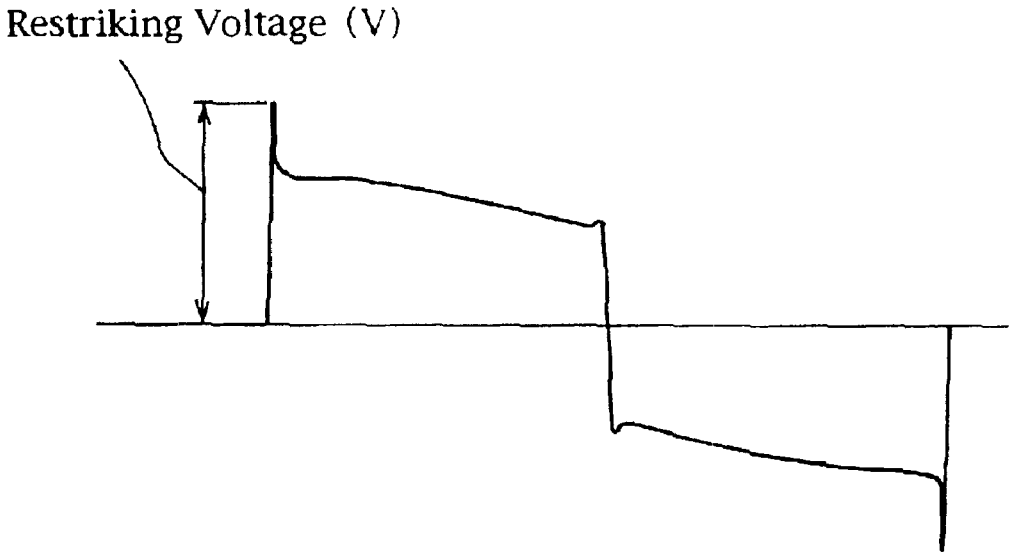
FIG. 7 is a diagram for explaining the restriking voltage in the image display system according to the third embodiment of the present invention.
Figure 8:
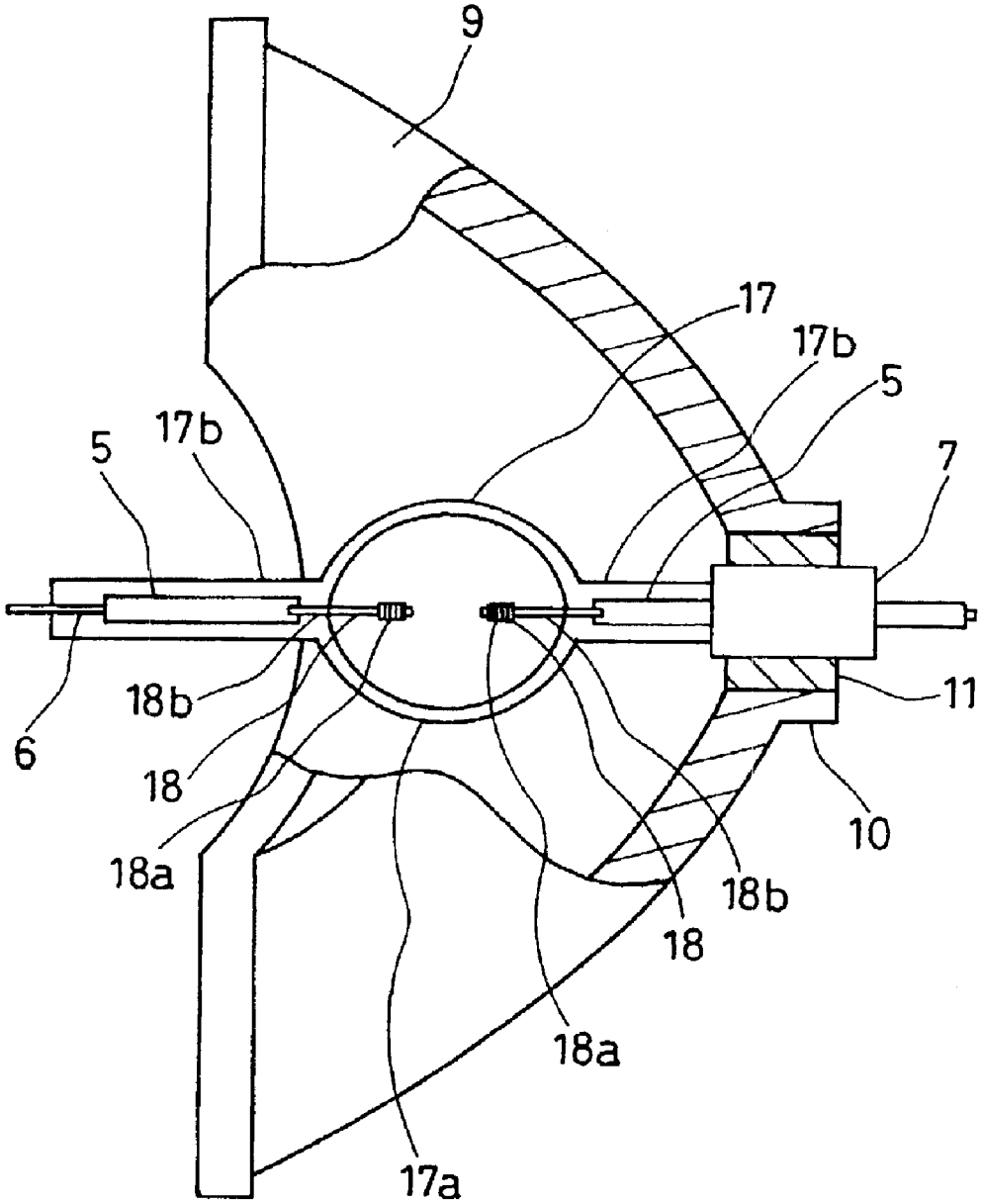
FIG. 8 (PRIOR ART)
FIG. 8 is a partially cutaway front view of a lighting optical apparatus comprising a conventional high pressure discharge lamp and a reflecting mirror.

It is understood that the restriking voltage (peak value) herein refers to the peak value of the voltage observed right after (within 10 seconds to two minutes from) the ignition of the lamp, as shown in FIG. 7. It is known that the greater the amount of impurity gases (e.g. $H_2O$, $H_2$) present in the discharge tube, the higher the restriking voltage.

Lamps with restriking voltages of 10 V or less, 15 V, 20 V, 25 V, 30 V, 40 V and 60 V, respectively, were manufactured and subjected to life tests. The test results showed that blackening was hardly generated in the lamps with a restriking voltage of not more than 20 V, but it was generated in the discharge tubes in those lamps with a restriking voltage of at least 25 V. Therefore, the above-mentioned range is specified. Furthermore, by making the restriking voltage not more than 15 V, generation of blackening of the lamp can be prevented more effectively. Still furthermore, by making the restriking voltage not more than 10 V, generation of blackening of the lamp can be prevented further effectively.

Furthermore, when the lamp is lit up by a direct current, if the volume of the electrode to be an anode during lighting is the same or less than the volume of the electrode to be a cathode, the temperature of the electrode to be an anode increases excessively, or alternatively, the temperature of the cathode becomes lower than a temperature at which discharge is maintained, which is not desirable as a lamp. By making the volume of the electrode which becomes an anode during lighting to be larger than that of the electrode which becomes a cathode, the temperatures of the anode and cathode become about the same, so that the electrode temperature is optimized. Therefore, the above-mentioned range is preferred.

Also, it is to be understood that in the present invention lighting by a direct current means not only by a direct current in a strict sense, but it may also be, for example, lighting by a rectified alternating current.

Furthermore, in the present invention, the tungsten as a material of the electrodes may contain impurities, for example, those mentioned in the Table 3 below. However, the less the amount of these impurities, the better the property of the lamp.

TABLE 3

| Type of Impurity | Al | Si | K | Cu | Cr | Fe | Ni | Mo | Ba |
|---|---|---|---|---|---|---|---|---|---|
| Amount of Impurity (ppm) | 2.9 | 3.3 | 7.0 | 1.0 | 2.9 | 10 | 0.9 | 5.9 | 1.2 |

(Note) Measuring Apparatus: at flameless atomic absorption photometex.

Finally, it is understood that the invention may be embodied in other specific forms without departing from the spirit or essential characteristics thereof. The embodiments disclosed in this application are to be considered in all respects as illustrative and not restrictive, so that the scope of the invention being indicated by the appended claims rather than by the foregoing description, and all changes which come within the meaning and range of equivalency of the claims are intended to be embraced therein.

What is claimed is:

1. A high pressure discharge lamp which is provided with a discharge tube containing a pair of electrodes therein and being filled with mercury, an inert gas and a halogen gas, an amount of the mercury filled being 0.12 to 0.35 mg/mm$^3$, the halogen gas being at least one gas selected from the group consisting of Cl, Br and I, and being present in an amount of $10^{-7}$ to $10^{-2}$ $\mu$mol/mm$^3$, and the electrodes mainly being composed of tungsten, wherein the tungsten [contains] *electrodes contain* not more than 12 ppm of potassium oxide ($K_2O$).

2. The high pressure discharge lamp according to claim 1, wherein the content of the potassium oxide ($K_2O$) in the tungsten *electrodes* is 0 to 8 ppm.

3. The high pressure discharge lamp according to claim 2, wherein the content of the potassium oxide ($K_2O$) in the tungsten *electrodes* is 0 to 5 ppm.

4. The high pressure discharge lamp according to claim 1, wherein the discharge tube is made of quartz glass, and the content of —OH group in the quartz glass is 0 to 3 ppm.

5. The high pressure discharge lamp according to claim 4, wherein the content of —OH group in the quartz glass is 0 to 1 ppm.

6. The high pressure discharge lamp according to claim 1, wherein a restriking voltage observed within several seconds to two minutes from starting is not more than 20 V.

7. The high pressure discharge lamp according to claim 6, wherein the restriking voltage observed within several seconds to two minutes from starting is 0 to 15 V.

8. The high pressure discharge lamp according to claim 7, wherein the restriking voltage observed within several seconds to two minutes from starting is 0 to 10 V.

9. The high pressure discharge lamp according to claim 1, which is lit by direct current, wherein a volume of the electrode to be an anode during lighting is larger than a volume of the electrode to be a cathode.

10. The high pressure discharge lamp according to claim 1, which exhibits illumination maintenance on a screen of at least 85% after lighting for 2000 hours.

11. The high pressure discharge lamp according to claim 10, wherein the illumination maintenance on the screen is at least 87% after lighting for 2000 hours.

12. The high pressure discharge lamp according to claim 11, wherein the illumination maintenance on the screen is at least 90% after lighting for 2000 hours.

13. [Alighting] *A lighting* optical apparatus comprising:

a high pressure discharge lamp which is provided with a discharge tube containing a pair of electrodes therein and being filled with mercury, an inert gas and a halogen gas, the amount of the mercury filled being 0.12 to 0.35 mg/mm$^3$, the halogen has being at least one gas selected from the group consisting of Cl, Br and I, and being present in an amount of $10^{-7}$ to $10^{-2}$ $\mu$mol/mm$^3$, and the electrodes mainly being composed of tungsten, wherein the tungsten [contains] *electrodes contain* not more than 12 ppm of potassium oxide ($K_2O$); and a reflecting mirror having a reflecting surface selected [form] *from* the group consisting of a paraboloidal surface and an ellipsoidal surface;

wherein an arc axis of the high pressure discharge lamp is located on the optical axis of the reflecting mirror so as to integrate the high pressure discharge lamp with the reflecting mirror.

14. An image display system comprising:

a light supplying source comprising a light source and lenses; and an image forming device;

wherein in the light supplying source is used a lighting optical apparatus comprising a high pressure discharge lamp which is provided with a discharge tube containing a pair of electrodes therein and being filled with mercury, an inert gas and a halogen gas, the amount of the mercury filled being 0.12 to 0.35 mg/mm$^3$, the halogen gas being at least one gas selected from the group consisting of Cl, Br and I, and being present in an amount of $10^{-7}$ to $10^{-2}$ $\mu$mol/mm$^3$, and the electrodes mainly being composed of tungsten, wherein the tungsten [contains] *electrodes contain* not more than 12 ppm of potassium oxide ($K_2O$); and a reflecting mirror having a reflecting surface selected from the group consisting of a paraboloidal surface and an ellipsoidal surface;

wherein an arc axis of the high pressure discharge lamp is located on the optical axis of the reflecting mirror so as to integrate the high pressure discharge lamp with the reflecting mirror.

*15. A tungsten electrode, having a configuration suitable for use in a discharge tube of high pressure lamp that is filled with mercury, an inert gas and a halogen gas, an amount of the mercury filled being 0.12 to 0.35 mg/mm$^3$, the halogen gas being at least one gas selected from the group consisting of chlorine, bromine and iodine, and being present in an amount of $10^{-7}$ to $10^{-2}$ $\mu$mol/mm$^3$, the tungsten electrode containing potassium oxide in an amount less than 12 ppm.*

* * * * *